United States Patent
DeAngelis et al.

(10) Patent No.: US 6,878,476 B2
(45) Date of Patent: Apr. 12, 2005

(54) METHOD AND APPARATUS FOR ALIGNMENT OF FUEL CELL COMPONENTS

(75) Inventors: Gary J. DeAngelis, Spencerport, NY (US); Arthur R. Williams, Spencerport, NY (US)

(73) Assignee: Delphi Technologies, Inc., Troy, MI (US)

(*) Notice: Subject to any disclaimer, the term of this patent is extended or adjusted under 35 U.S.C. 154(b) by 602 days.

(21) Appl. No.: 10/085,868

(22) Filed: Feb. 28, 2002

(65) Prior Publication Data

US 2003/0162080 A1 Aug. 28, 2003

(51) Int. Cl.[7] .............................................. H01M 4/66
(52) U.S. Cl. ............................. 429/34; 429/38; 429/39
(58) Field of Search ............................. 429/34, 35, 36, 429/37, 38, 39

(56) References Cited

U.S. PATENT DOCUMENTS

| | | | |
|---|---|---|---|
| 6,321,145 B1 | 11/2001 | Rajashekara | |
| 6,423,896 B1 | 7/2002 | Keegan | |
| 6,455,185 B2 | 9/2002 | Bircann et al. | |
| 6,485,852 B1 | 11/2002 | Miller et al. | |
| 6,509,113 B2 | 1/2003 | Keegan | |
| 6,551,734 B1 | 4/2003 | Simpkins et al. | |
| 6,562,496 B2 | 5/2003 | Faville et al. | |
| 6,608,463 B1 | 8/2003 | Kelly et al. | |
| 6,613,468 B2 | 9/2003 | Simpkins et al. | |
| 6,613,469 B2 | 9/2003 | Keegan | |
| 6,627,339 B2 | 9/2003 | Haltiner, Jr. | |
| 6,630,264 B2 | 10/2003 | Haltiner, Jr. et al. | |
| 2003/0096151 A1 * | 5/2003 | Blunk et al. | 429/34 |

* cited by examiner

Primary Examiner—Michael Barr
Assistant Examiner—Monique Wills
(74) Attorney, Agent, or Firm—Paul L. Marshall

(57) ABSTRACT

In a proton exchange membrane fuel cell assembly, a plurality of bores is provided in each anode plate and each cathode plate at a standard distance from the active area of each plate. The bores in the anode plate are stepped. Non-conductive stepped pins, each having a well in a large-diameter portion thereof, are inserted concentrically into the bores of adjacent anode and cathode plates to form a bipolar plate subassembly. The pins extend through the bipolar plate subassembly and have a reduced-diameter portion for engaging the wells of adjacent pins in an adjacent bipolar plate subassembly. Preferably, bores and pins are provided in rotational symmetry near opposite edges of each plate. The pins thus both align an anode and cathode to form a bipolar plate subassembly and also align a plurality of bipolar plate subassemblies, in combination with a plurality of proton exchange membranes therebetween, to form a fuel cell stack having all anode plates accurately aligned with all cathode plates.

9 Claims, 4 Drawing Sheets

METHOD AND APPARATUS FOR ALIGNMENT OF FUEL CELL COMPONENTS

TECHNICAL FIELD

The present invention relates to fuel cells; more particularly, to proton exchange fuel cells; and most particularly, to a method and apparatus for providing precise alignment of anode and cathode plates during formation of a bipolar plate assembly, and of a plurality of such assemblies during subsequent formation of a fuel cell stack.

BACKGROUND OF THE INVENTION

Fuel cell assemblies employing proton exchange membranes are well known. Such assemblies typically comprise a stack of fuel cell modules, each module having an anode and a cathode separated by a catalytic proton exchange membrane, and the modules in the stack being connected in series electrically to provide a desired voltage output. Fuel in the form of hydrogen, or hydrogen-containing mixtures such as "reformed" hydrocarbons, is flowed through a first set of reaction channels formed in the anode surface adjacent a first side of the membrane. Oxygen, typically in the form of air, is flowed through a second set of reaction channels formed in the cathode surface adjacent the opposite side of the membrane. Hydrogen is catalytically oxidized at the anode-membrane interface. The resulting proton, $H^+$, migrates through the membrane to the cathode-membrane interface where it combines with ionic oxygen to form water. Electrons flow from the anode through a load to the cathode, doing electrical work in the load.

Protons migrate only in those areas of the fuel cell in which the anode and cathode reaction channels are directly opposed across the membrane. Misalignment between anode and cathode channels results in some portion of the anode channels unopposed by cathode channels, and correspondingly, an equal area of the cathode channels unopposed by anode channels. Thus, the effective area of membrane for migration is reduced, and so, proportionally, is the electrical output of the fuel cell.

In the prior art, anodes and cathodes typically are aligned visually during assembly by aligning outer edges, which edges are not necessarily of uniform distance from the reactive areas on the anodes and cathodes. What is needed is a method and apparatus for assuring that the reactive areas on the anodes and cathodes are aligned fully and automatically during assembly of a fuel cell.

It is a principal object of the present invention to provide an improved method and apparatus for fully and automatically aligning an anode and a cathode during formation of a bipolar plate.

It is a further object of the invention to provide an improved method and apparatus for fully and automatically aligning a plurality of bipolar plates in assembling a fuel cell stack.

SUMMARY OF THE INVENTION

Briefly described, in a proton exchange membrane fuel cell assembly, a pair of bores is provided symmetrically in each anode plate and each cathode plate at a precisely located distance from the active area of each plate. The bores in the anode plate are stepped. Non-conductive stepped pins, each having a axial well in a large-diameter portion thereof, are inserted concentrically into the bores of adjacent anode and cathode plates to form a bipolar plate subassembly. The pins extend through the bipolar plate subassembly and have a reduced-diameter portion for engaging the wells of adjacent pins in an adjacent bipolar plate subassembly to form a fuel cell stack. Preferably, bores and pins are provided in rotational symmetry near opposite edges of each plate. The pins thus both align an anode and cathode to form a bipolar plate subassembly and also align a plurality of bipolar plate subassemblies, in combination with a plurality of proton exchange membranes therebetween, to form a fuel cell stack having all anode plates suitably aligned with all cathode plates.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
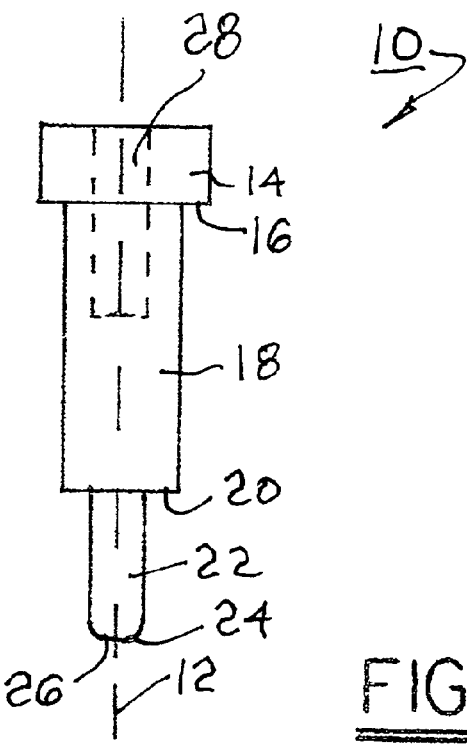
FIG. 1 is an elevational view of an alignment pin in accordance with the invention.
Figure 2:
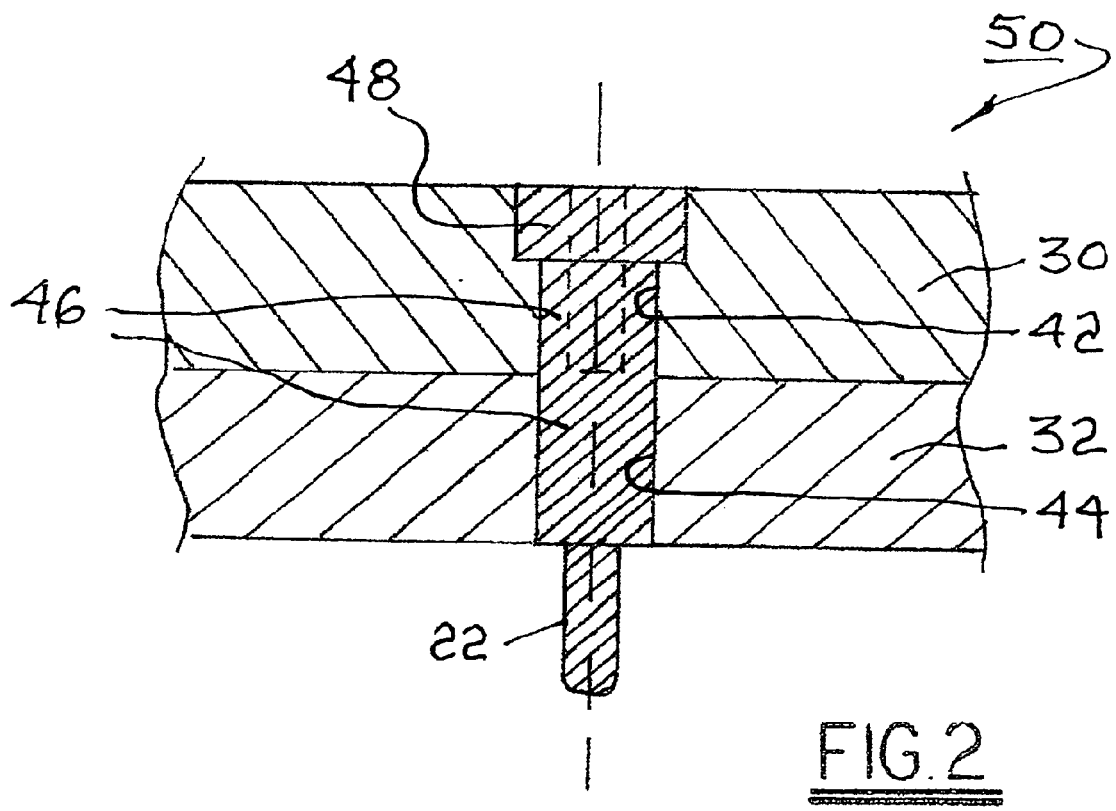
FIG. 2 is a cross-sectional elevational view of a portion of a bipolar plate subassembly, showing alignment of an anode plate and a cathode plate by the pin shown in FIG. 1.

Referring to FIGS. 1 through 4, an alignment pin 10 in accordance with the invention is an elongate object, preferably generally cylindrical, having a longitudinal axis 12. Pin 10 is formed preferably in three coaxially aligned portions: a first largest diameter portion 14, which steps down at shoulder 16 to an intermediate diameter portion 18, which steps down at shoulder 20 to a smallest diameter portion 22. Portion 22 preferably is chamfered or radiused 24 at its distal end 26. An axial well 28 extends into pin 10 through first portion 14 and has a diameter substantially identical with that of portion 22 such that two identical pins 10 may be coaxially coupled together by inserting portion 22 of one pin into well 28 of the other. Pin 10 is formed of a suitable dielectric material, for example, a thermosetting vinyl ester, preferably glass-fiber filled to provide incompressibility when multiple pins are stacked together under compressive load.

Anode 30 and cathode 32 are conductive plates preferably formed of a phenolic resin loaded with graphite to provide conductivity. The anode and cathode plates are formed to be substantially identical in plan view, each having inlet air, cooling and fuel ports 34 and outlet air, cooling and fuel ports 36 disposed at opposing ends of the plates. Typically, the anode and cathode plates are provided with microchannels (not visible in FIGS. 1–4) on surfaces thereof for distribution of fuel and oxygen against opposite sides of a proton exchange membrane, as described further below. Microchannels are also provided for distribution of coolant.

Figure 3:
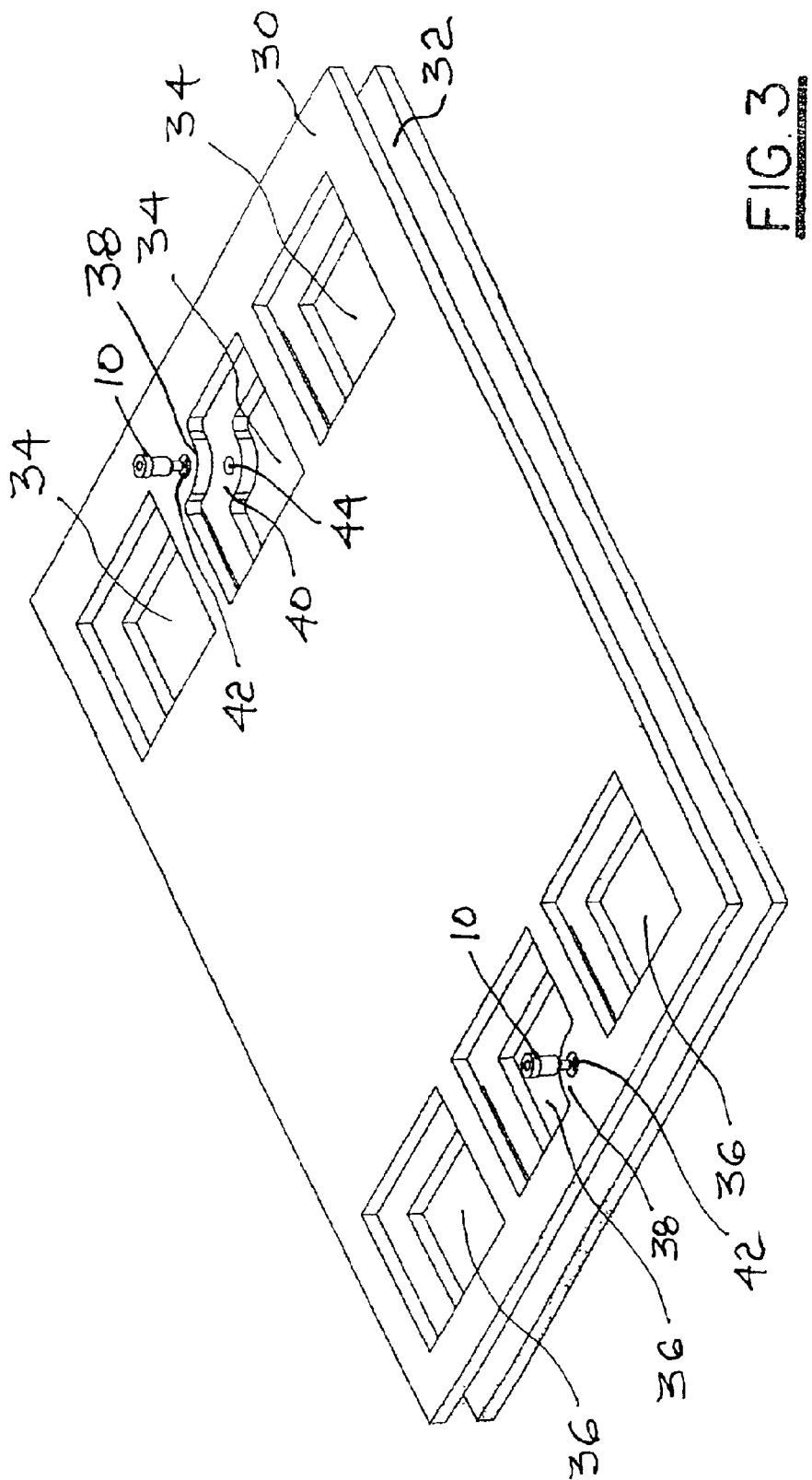
FIG. 3 is an exploded isometric view from above of a bipolar plate subassembly, showing alignment of an anode plate and a cathode plate by pins like those shown in FIG. 1.
Figure 4:
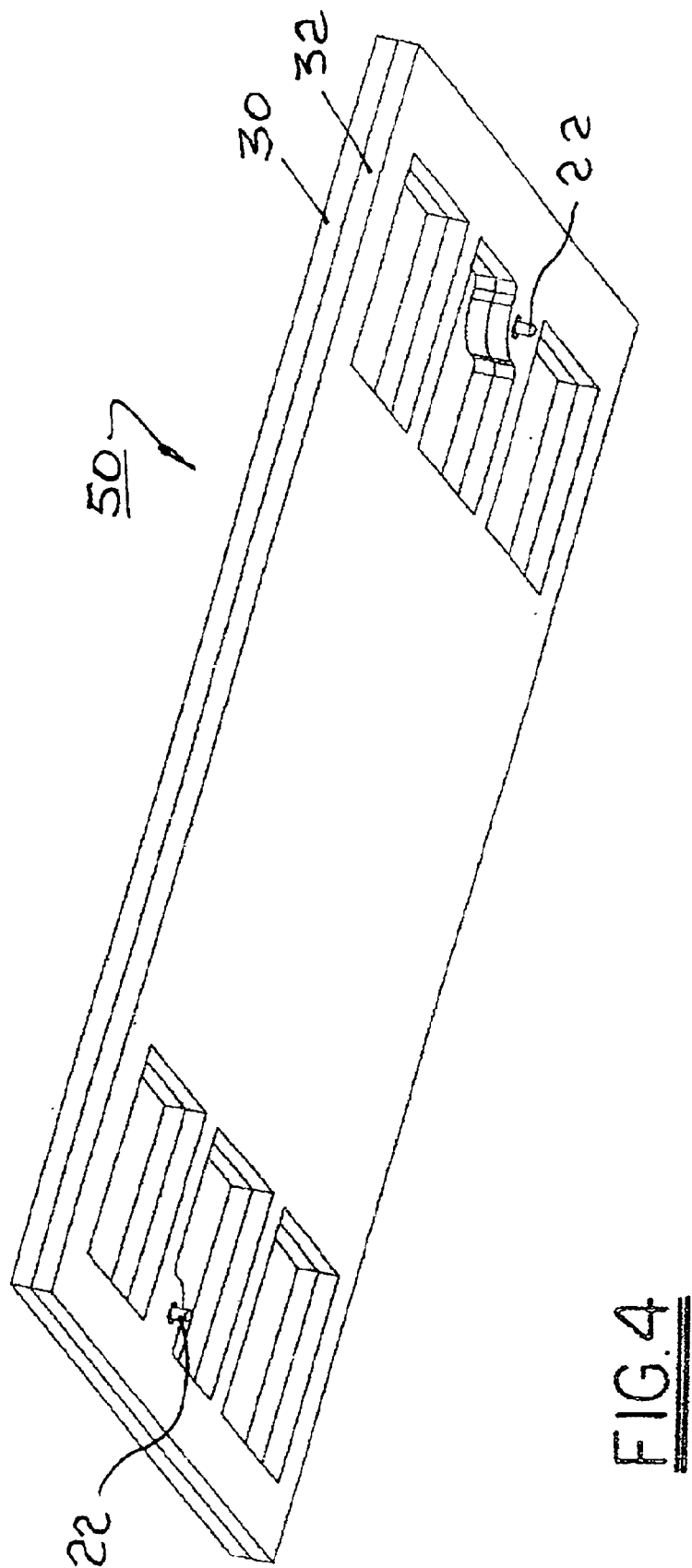
FIG. 4 is an isometric view from below of a bipolar plate subassembly formed in accordance with the invention, showing alignment pins extending from the subassembly in readiness for mating with analogous pins in other subassemblies to form a fuel cell stack.

Each anode and cathode plate 30,32 is provided with a feature 38,40, respectively, partially extending into one of ports 34 and into one of ports 36, respectively, as shown in FIGS. 3 and 4, and having an alignment bore 42,44, respectively, extending through the feature, each bore having an axis identically disposed in the respective anode or cathode with respect to the ports 34 or 36. Preferably, the ports, features, and bores are symmetrically disposed with respect to each end of the anode and cathode plates such that the plates may be assembled to each other, as described further below, without regard for end-for-end orientation.

Each of bores 42,44 has a first diameter portion 46 substantially identical to that of intermediate diameter portion 18 of pin 10. In addition, one of bores 42,44, preferably anode bore 42, has a second counterbore portion 48 having a diameter and depth substantially identical to the diameter and axial length of largest diameter portion 14 of pin 10.

In a first alignment method for making a bipolar plate subassembly 50 comprising an anode plate and a cathode plate, in a first step a first pin 10 is inserted into a first bore 42 in an anode plate 30 such that largest diameter portion 14 of the pin is fully seated into counterbore portion 48 of bore 42. In a second step, a second pin 10 is identically inserted into a second bore 42 in the same anode plate 30. In a third step, the two pins 10 are inserted into bores 44 of a cathode plate 32 such that the anode plate and the cathode plate are in mutual contact and are accurately aligned with each other.

Figure 5:
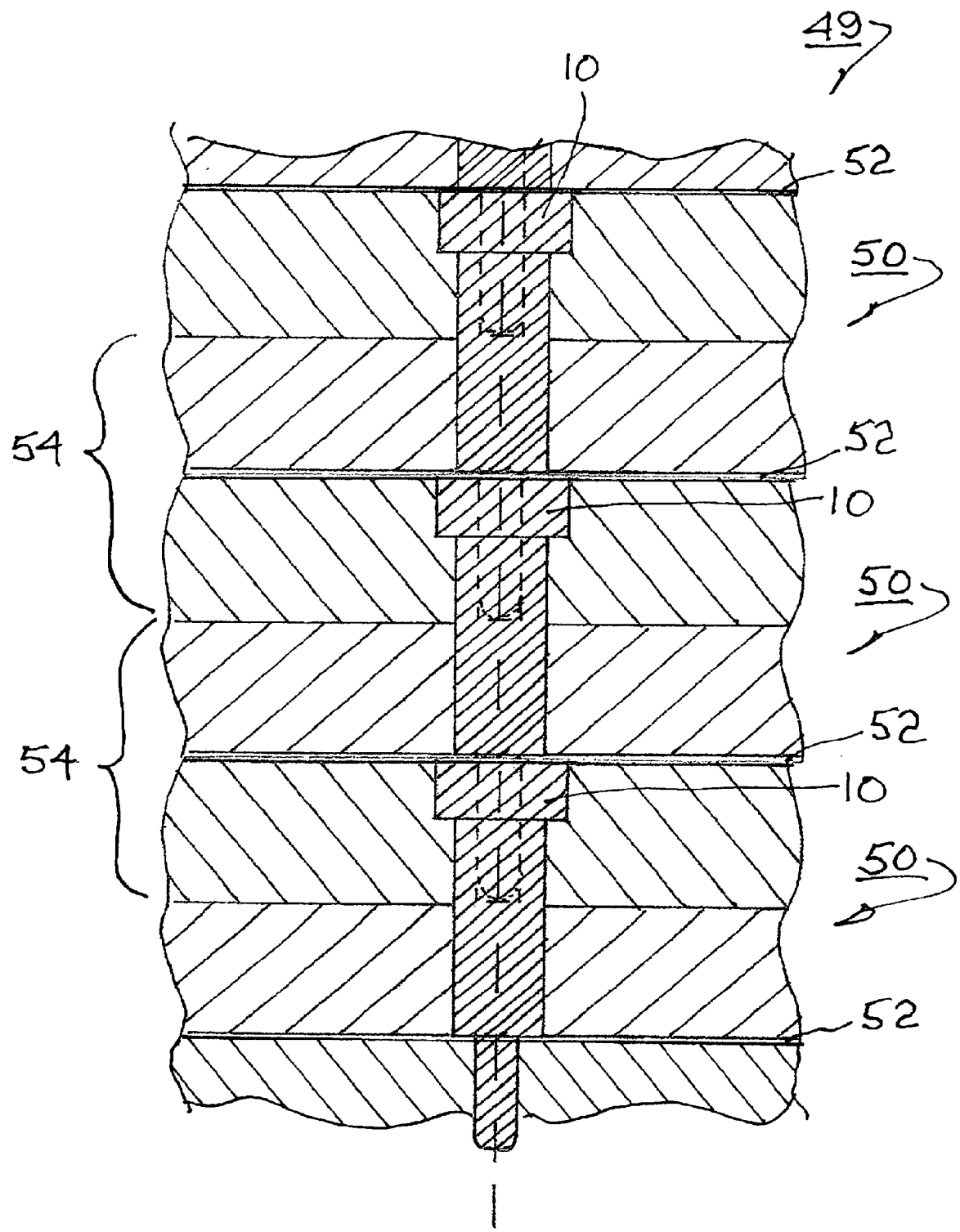
FIG. 5 is a cross-sectional view of a plurality of bipolar plate subassemblies forming a stack aligned by apparatus and methods in accordance with the present invention.

In a second alignment method in accordance with the invention, for making a portion of a fuel cell stack assembly 49 as shown in FIG. 5, a plurality of bipolar plate subassemblies 50 are accurately aligned by coaxially inserting the smallest diameter portions 22 of the pins for a first bipolar plate into the respective axial wells 28 in the pins in a second bipolar plate, a proton exchange membrane 52 being sandwiched between adjacent bipolar plate subassemblies. Thus each combination of a cathode, proton exchange membrane, and anode defines an individual fuel cell element 54. Additional bipolar plate subassemblies and membranes may be added similarly to the stack as desired. The stack may be completed in known fashion (not shown) by addition of a membrane and single cathode plate at one end of the stack and a membrane and single anode plate at the opposite end of the stack.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. Apparatus for forming a bipolar plate subassembly for a fuel cell, comprising:
   a) a first anode plate having a reactive area and having a first anode bore therethrough, said first anode bore having an axis disposed a standard distance from said anode reactive area;
   b) a first cathode plate having a reactive area and having a first cathode bore therethrough, said first cathode bore having an axis disposed a standard distance from said cathode reactive area; and
   c) a first pin disposed in said first anode bore and said first cathode bore to axially align said bores and join said anode plate to said cathode plate to form said bipolar plate subassembly having said respective reactive areas of said anode plate and said cathode plate aligned.

2. Apparatus in accordance with claim 1 wherein:
   a) said anode plate includes a second anode bore having an axis disposed a standard distance from said anode reactive area;
   b) said cathode plate includes a second cathode bore having an axis disposed a standard distance from said cathode reactive area; and
   c) a second pin is disposed in said second anode bore and said second cathode bore.

3. Apparatus in accordance with claim 1 wherein one of said first anode bore and said first cathode bore has a counterbore portion having a diameter larger than said bore, and wherein said first pin has a first end portion having a diameter substantially equal to said diameter of said counterbore such that said first pin end portion is receivable in said counterbore portion.

4. Apparatus in accordance with claim 3 wherein said pin first end portion is provided with an axial well having a well diameter, and wherein said pin has a second end portion opposite said first end portion, said second end portion having a diameter substantially equal to said well diameter.

5. Apparatus in accordance with claim 4 wherein said pin second end portion extends from said bipolar plate subassembly.

6. A method for forming a bipolar plate subassembly for a fuel cell, comprising the steps of:
   a) providing an anode plate having a first anode bore therethrough, said first anode bore having an axis disposed a standard distance from said anode reactive area;
   b) providing a cathode plate having a first cathode bore therethrough, said first cathode bore having an axis disposed a standard distance from said cathode reactive area; and
   c) disposing a first pin in said first anode bore and said first cathode bore to axially align said bores and join said anode plate to said cathode plate to form said bipolar plate subassembly having said respective reactive areas of said anode plate and said cathode plate aligned.

7. A method in accordance with claim 6, further comprising the steps of:
   a) providing a second anode bore through said anode plate, said second anode bore having an axis disposed a standard distance from said anode reactive area;
   b) providing a second cathode bore through said cathode plate, said second cathode bore having an axis disposed a standard distance from said cathode reactive area; and
   c) disposing a second pin in said second anode bore and said second cathode bore.

8. A method for joining first and second bipolar plate subassemblies to form a portion of a proton exchange membrane fuel cell stack assembly, wherein a first one of said subassemblies includes a first pin portion extending from said subassembly, and wherein a second one of said subassemblies includes a pin portion having an axial well, comprising the steps of:
   a) disposing a proton exchange membrane between said first and second subassemblies;
   b) axially aligning said pin portion of said first subassembly with said axial well of said second subassembly; and
   c) inserting said pin portion into said well to capture said membrane between said first and second bipolar plate subassemblies.

9. A method in accordance with claim 8 wherein one of said subassemblies includes a second pin portion extending from said subassembly, and wherein the other of said subassemblies includes a second pin portion having a second axial well, comprising the steps of:
   a) axially aligning said second extending pin portion with said second axial well; and
   b) inserting said second extending pin portion into said second axial well.

* * * * *